United States Patent [19]

De Alessi et al.

[11] Patent Number: 4,844,194

[45] Date of Patent: Jul. 4, 1989

[54] AIR CUSHION SHOE

[75] Inventors: Renato De Alessi; Enrico Garau, both of Turin, Italy

[73] Assignee: D.E.A. Digital Electronic Automation S.p.A., Moncalieri, Italy

[21] Appl. No.: 81,341

[22] Filed: Aug. 4, 1987

[30] Foreign Application Priority Data

Aug. 6, 1986 [IT] Italy ............................... 53736 B/86

[51] Int. Cl.[4] .............................................. B60V 1/00
[52] U.S. Cl. .................................. 180/125; 104/23.2; 188/161
[58] Field of Search ....................... 180/125, 116, 164; 188/32, 161, 163; 104/23.2

[56] References Cited

U.S. PATENT DOCUMENTS 3,111,092  11/1963  Raviolo .......................... 104/23.2 X
3,253,665  5/1966   Schienle ............................ 180/164
3,457,874  7/1969   Tezuka et al. ..................... 104/23.2
4,627,362  12/1986  Ise et al. .......................... 180/125 X

FOREIGN PATENT DOCUMENTS 3434116  3/1986   Fed. Rep. of Germany ...... 188/161
878818   10/1971  United Kingdom ............... 104/23.2

Primary Examiner—John A. Pekar
Attorney, Agent, or Firm—Gifford, Groh, Sheridan, Sprinkle and Dolgorukov

[57] ABSTRACT

The shoe has a flat surface which can slide with reduced friction on a guide surface, means for introduction and distribution of compressed air to generate a supporting air cushion between the said surfaces, and a plurality of permanent magnets generating a force of attraction between the shoe and the guide surface in such a way as to cause the shoe itself to stop immediately when the supply of compressed air is interrupted.

9 Claims, 4 Drawing Sheets

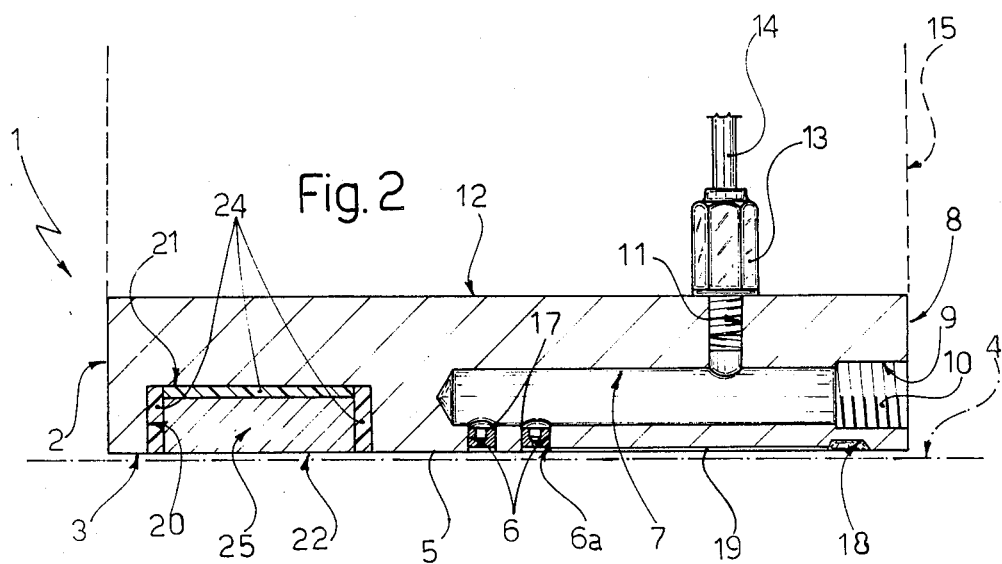
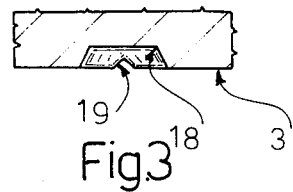

4,844,194

AIR CUSHION SHOE

BACKGROUND OF THE INVENTION

The present invention relates to a supporting air cushion shoe able to support a load movable on a substantially flat guide surface with low friction.

Air cushion shoes are known comprising a flat surface able to cooperate with the said guide surface, and means for introduction and distribution of compressed air between the said surfaces in such a way as to produce a supporting fluid cushion between the surfaces themselves. Such shoes find application predominantly on high precision systems (for example, measurement machines, positioning systems etc) in which the presence of friction between the parts in relative movement is detrimental to the precision and dynamics. Systems of the type described generally require the presence of stop means between the parts in relative movement in that the simple interruption of the supply of compressed air to the shoes is not sufficient to obtain a stable, immediate and precise positioning between the said parts.

Such stop means, of mechanical or electromagnetic nature, are usually made as a unit separate from the supporting shoes. This involves a relatively large encumbrance due to the dimensions of the supporting shoes themselves and of the stop unit; moreover, this involves the necessity of utilising more shoes and/or more stop units for the purpose of obtaining two force systems (supporting and stop forces respectively) with the respective resultants having a common line of action; this condition is, in fact, necessary so that the system will be subject to a pure force (supporting or stopping force depending on the predominance of one of the two resultants) acting on a plane orthogonal to the cooperating flat surfaces, without disturbing couples.

SUMMARY OF THE INVENTION

The object of the present invention is to provide an air cushion shoe which includes stop means integrated into the shoe itself and therefore to allow the above specified disadvantages to be overcome.

The said object is achieved by the present invention in that it relates to an air cushion support shoe of the type comprising at least one flat surface slidable with low friction over a guide surface and means for the introduction and distribution of compressed air to generate a supporting air cushion between the said flat surface and the said guide surface, characterised by the fact that it includes magnetic means generating a force of attraction between the said shoe and the said guide surface; the said supporting air cushion generating a resultant force opposed to the said force of attraction and a greater strength.

BRIEF DESCRIPTION OF THE DRAWINGS

For a better understanding of the present invention two preferred embodiments are herein described by way of non-limitative example, and with reference to the attached drawings, in which

FIG. 2 is a section taken on the line II—II of FIG. 1;

FIG. 3 is an enlarged section of a detail of the shoe of FIG. 1 taken on the line III—III;

DETAILED DESCRIPTION OF THE INVENTION

Figure 1:
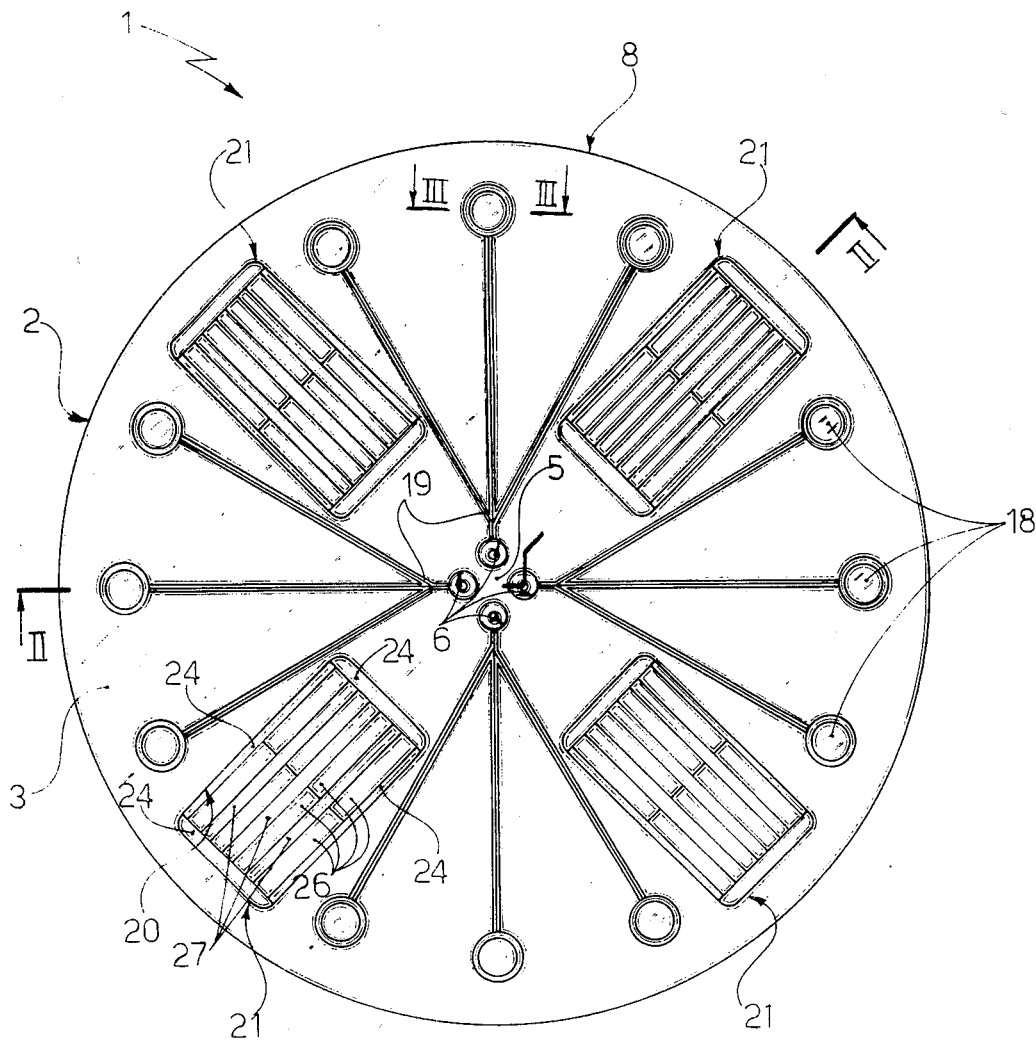
FIG. 1 is an under plan view of an air cushion support shoe formed as a first embodiment of the present invention.

With reference to FIGS. 1 and 2, an air cushion support shoe is generally indicated with the reference numeral 1, which shoe can be fixed to the lower region of an element 15 (schematically indicated in broken outline) which must be translated on a guide surface 4.

In particular, the shoe 1 comprises a substantially cylindrical body 2 provided with a flat base surface 3 which can cooperate with the corresponding guide surface 4. A central portion 5 of the flat surface 3 has four holes 6 angularly spaced by 90° and communicating within the interior of the body 2 with a blind hole 7 formed in a radial direction on a lateral surface 8 of the said body 2. The blind hole 7, provided with a threaded mouth portion 9 sealingly engaged by a threaded plug 10, communicates with a further hole 11 formed in an axial direction on an upper flat surface 12 of the body 2. A pneumatic connector 13, for example, of the quick release type, is screwed into a threaded mouth portion of the hole 11 and permits the connection of the shoe 1 to a pneumatic supply circuit a flexible terminal duct 14 of which has been partially shown.

Into each of the holes 6 is forced an internally calibrated bush 17 in positions slightly retracted with respect to the surface 3 in such a way as to leave free a small outlet portion 6a of each hole 6.

The surface 3 further has four sets of three cavities or pockets 18 of circular form and trapezoidal section disposed around the circumference close to the periphery of the surface 3 itself in such a way that the central pocket 18 of each set of three is located in radial alignment with a respective hole 6, and the two side pockets 18 are equally angularly spaced with respect to it on opposite sides. Each hole 6 is connected to the associated set of three pockets 18 by a groove 19 which extends in a radial direction from the portion 6a of the hole itself and branches after a short section to the three cavities. As illustrated in FIG. 3, this groove conveniently has a V-cross section.

The surface 3 further has four recesses 20 of elongate parallelepiped form, each of which is disposed in a radial direction between two adjacent sets of three pockets 18 and associated grooves 19. These recesses 20 house respective permanent magnets 21 of corresponding form, in such a way that the surface 22 of each magnet 21 facing outwardly of the shoe 1 is located in the same plane as the surface 3. In particular, each magnet 21 comprises outer wall 24 disposed in contact with corresponding walls of the recess 20 made of soft iron laminations and an inner portion 25 constituted by magnetic elements 26 of known type alternating with laminations 27 of soft iron.

Figure 4:
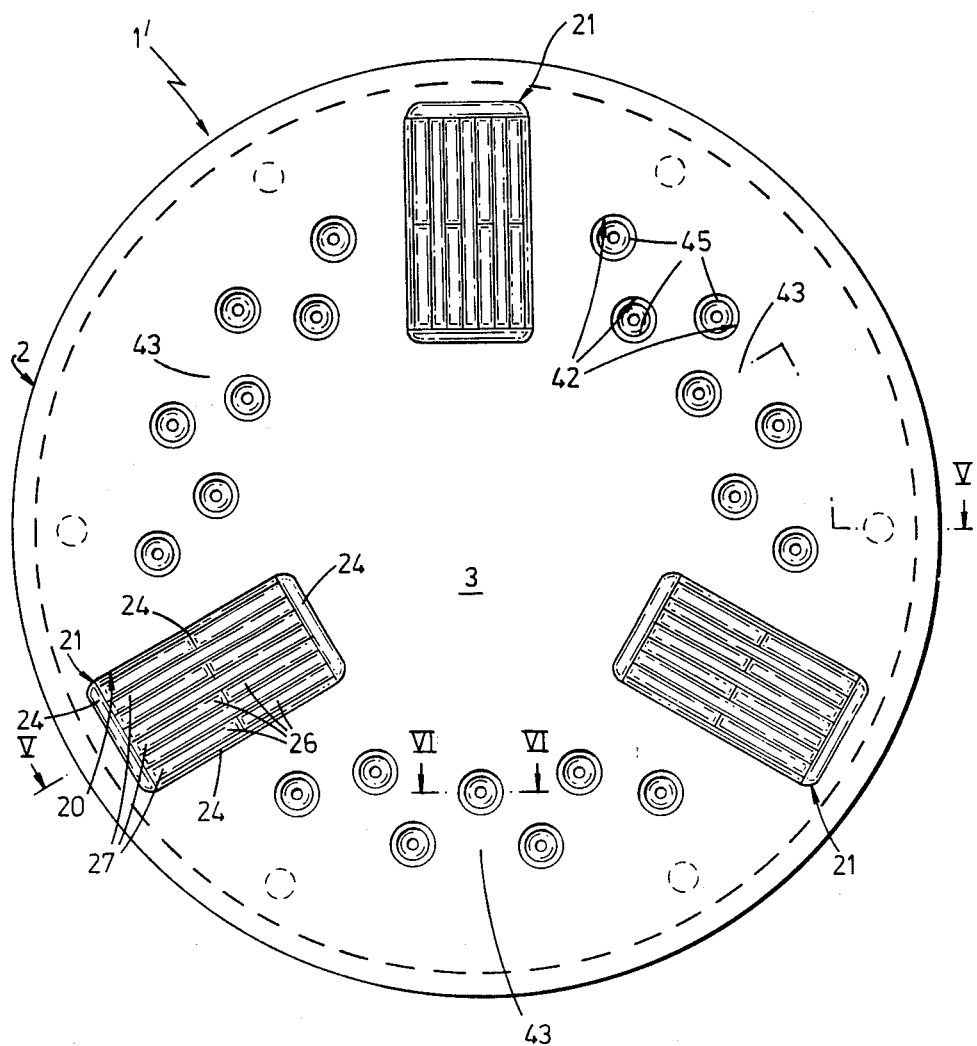
FIG. 4 is an under plan of an air cushion support shoe formed as a second embodiment of the present invention.
Figure 5:
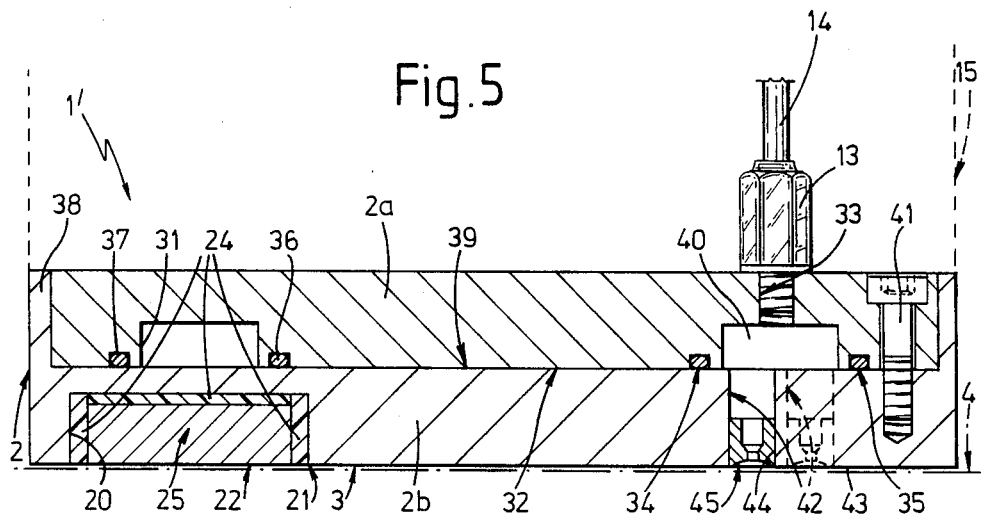
FIG. 5 is a section taken on the line V—V of FIG. 4.

With reference to FIGS. 4 and 5, a second air cushion support show is generally indicated with 1'. In the following description the same reference numerals will be utilised to indicate identical or corresponding parts to those already described with reference to the shoe 1.

The shoe 1' comprises a cylindrical body 2 made in two parts 2a, 2b. The upper part 2a, in the form of a circular plate, is provided with an annular groove 31 of substantially rectangular cross-section disposed on a lower face 32 of the upper part 2a. A pneumatic connector 13, for example of the quick release type, is screwed into a through hole 33 formed in an axial direction in corespondence with the annular groove 31, and permits the connection of the shoe 1 to a pneumatic supply circuit a terminal duct 14 of which has been represented.

The upper part 2a further includes two annular seats 34, 35 concentric with the annular groove 31 and disposed, respectively, inwardly and outwardly of this latter, in which are housed respective sealing rings 36, 37.

The lower part 2b also has a circular plate form and is provided with a peripheral upward projection 38 within which the upper part 2a is housed in such a way that the annular groove 31 and an upper wall 39 of the lower part 2b, which faces it, together define an annular chamber 40.

The two parts 2a, 2b are connected together by a plurality of gripper screws 41 equally angularly spaced around a periphery outwardly of the seal 37.

A flat base surface 3 of the shoe 1', able to cooperate with a guide surface 4, has three recesses 20 disposed at 120° and housing respective permanent magnets 21 in a manner entirely similar to that described for the shoe 1. The base surface 3 further has a plurality of through holes 42 communicating with the annular chamber 34 and equally angularly spaced around circumferential lines concentric to the shoe 1' in peripheral portions 43 of the surface 3 lying between the magnets 21.

Figure 6:
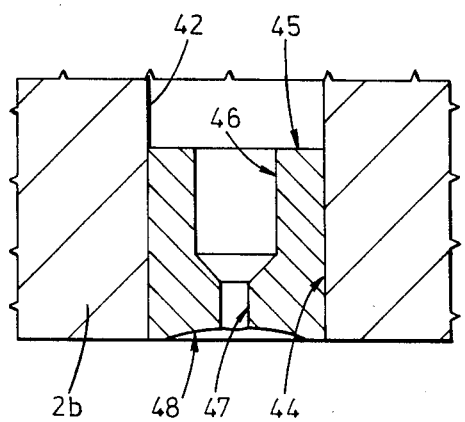
FIG. 6 is an enlarged section of a detail of the shoe of FIG. 4, taken on the line VI—VI.

In an outlet portion 44 of each hole 42 is fitted a cylindrical bush 45, illustrated in detail in FIG. 6. This bush 45 has an inner hole 46 with a portion 47 of small calibrated diameter communicating with an outer cavity 48 of the bush 45 which is substantially in the form of a spherical bowl facing the guide surface 4. The operation of the shoe 1 described above is as follows.

If no compressed air is supplied to the shoe 1 this is locked against the guide surface 4 by the effect of the permanent magnets 21. When the supply is activated compressed air passes from the duct 14 through the connector 13 and the blind hole 7 to the holes 6 and from these is distributed through the grooves 19 to the pockets 18.

It is observed that when the surface 3 is in contact with the guide surface 4 the grooves 19 constitute in effect compressed air introduction ducts leading to the closed chambers defined by the pockets 18 and the corresponding portions of the guide surface 4 facing them; the calibrated bushes 17 ensure correct distribution of compressed air to the various pockets 18. The overall area of the pockets is dimensioned in such a way that the pressure exerted by the compressed air, acting on this area, generates a resultant upward force acting on the shoe 1 of sufficient strength to overcome the force of attraction of the magnets 21 and to cause a first separation of the shoe 1 from the guide surface 4 after which the attractive force exerted by the magnet 21 is less.

After this separation a substantially air cushion of smaller thickness is formed between the surfaces 3 and 4 determined by the continuous flow of compressed air from the centre to the periphery of the shoe. In these conditions sliding friction of the shoe 1 on the guide surface 4 is reduced to only the resultant of the viscous forces exchanged between the surface 3 and air cushion so that the shoe 1 can slide on the guide surface 4 under the action of low transverse forces.

Stopping of the shoe 1 is obtained in a practically instantaneous manner by the action of the magnets 21 simply by interrupting the supply of compressed air.

The operation of the shoe 1° is entirely analogous. In this case the function of the pockets 18 is performed by the cavities 48 of the bushes 45 and the distribution of compressed air is effected internally by means of the annular chamber 34.

It is observed that the shoe 1 requires guide surfaces 4 having a high degree of surface finish in that the presence of superficial irregularities (excess roughness, holes etc) can strongly alter the flow of compressed air in the grooves 19 which are of rather small depth, and can cause non-uniformity in the delivery of air to the various pockets 18.

The shoe 1' on the other hand can be utilised on guide surfaces 4 with a relatively modest surface finish. In fact, since the distribution of air between the various holes 42 takes place within the shoe 1' it is not influenced in any way by the quality of the guide surface 4; if one of the holes 42 is located in correspondence with a surface irregularity, the height of lift provided by it is altered, but since the phenomenon affects only the individual hole no appreciable perturbation in the overall operation of the shoe 1' occurs.

From a study of the characteristics of the shoes 1 and 1' formed according to the present invention the advantages which they make possible are evident. First of all, the shoes 1 and 1' are provided with their own stop means and therefore do not require the use of an additional stop unit; they are of small dimensions; moreover, they can be used on their own in that the symmetrical disposition of the supporting and stop means generate resultant loads which are purely vertical, the line of action of which coincides with the vertical axis of the shoes 1, 1'.

Finally, it is clear that the shoes 1 and 1' described above can have modifications and variations introduced thereto without by this departing from the protective ambit of the invention. In particular, the shape of the shoe 1 or 1' can be varied; the form, number and arrangement of the pockets 18 or of the cavities 48, of the grooves 19 and of the magnets 21 may also be varied as may the number and arrangement of the holes 6 or 42; finally, the permanent magnets 21 can be replaced by electromagnets.

We claim:

1. An improved air cushion support shoe of the type having at least one flat surface slidable with low friction over a guide surface and means for the introduction and distribution of compressed air operable to generate a supporting air cushion between said at least one flat surface and said guide surface, wherein the improvement comprises a plurality of recesses positioned on said flat surface and a plurality of magnets, each of said plurality of magnets being mounted in a respective one of said plurality of recesses, said plurality of magnets generating a force of attraction between said shoe and said guide surface, said supporting air cushion generating a resultant force opposing said force of attraction and being of greater strength.

2. A shoe according to claim 1, wherein each of said plurality of magnets comprises a permanent magnet.

3. A shoe according to claim 1, characterised by the fact that said shoe is fixed on a lower region of an element for movement of said shoe on said guide surface.

4. An improved air cushion support shoe of the type having at least one flat surface slidable with low friction over a guide surface and means for the introduction and distribution of compressed air operable to generate a supporting air cushion between said at least one flat surface and said guide surface, wherein the improvement comprises said means for introduction and distribution of compressed air having at least one nozzle disposed in said flat surface and a plurality of cavities having a trapezoidal cross-section, said plurality of cavities disposed adjacent a periphery of said flat surface, said plurality of cavities being connected to said at least one nozzle by a plurality of grooves extending along said flat surface.

5. An improved air cushion support shoe of the type having at least one flat surface slidable with low friction over a guide surface and means for the introduction and distribution of compressed air operable to generate a supporting air cushion between said at least one flat surface and said guide surface, wherein the improvement comprises said means for introduction and distribution of compressed air having at least one nozzle disposed in said flat surface and a plurality of cavities having a V-shaped cross-section disposed adjacent a periphery of said flat surface, said plurality of cavities being connected to at least one nozzle by a plurality of grooves extending along said flat surface.

6. An improved air cushion support shoe of the type having at least one flat surface slidable with low friction over a guide surface and means for the introduction and distribution of compressed air operable to generate a supporting air cushion between said at least one flat surface and said guide surface, wherein the improvement comprises said means for the introduction and distribution of compressed air including a plurality of nozzles being angularly spaced around said at least one flat surface along at least one peripheral circumference, each of said plurality of nozzles having a hole and a calibrated bush, said hole being formed in said flat surface and communicating with a compressed air supply chamber, said calibrated bush being disposed in each said hole.

7. A shoe according to claim 6, further comprising said supply chamber is formed internally in said shoe for flow communication with said plurality of nozzles.

8. A shoe according to claim 6 wherein said calibrated bush further comprises a cavity facing said guide surface.

9. A shoe according to claim 8, characterised by the fact that said cavity forms a spherical bowl.

* * * * *

UNITED STATES PATENT AND TRADEMARK OFFICE
CERTIFICATE OF CORRECTION

PATENT NO.  : 4,844,194
DATED       : July 4, 1989
INVENTOR(S) : Renato De Alessi; Enrico Garau It is certified that error appears in the above-identified patent and that said Letters Patent is hereby corrected as shown below:

Col. 3, line 7, delete "1" and insert --1'--;

line 29, delete "34" and insert --40--;

line 62, after "substantially" insert --constant--;

line 65, correct the spelling of "center".

Col. 4, line 6, delete "1°" and insert --1'--;

line 10, delete "34" and insert --40--.

Signed and Sealed this

Twenty-sixth Day of June, 1990

Attest:

HARRY F. MANBECK, JR.

*Attesting Officer*       *Commissioner of Patents and Trademarks*